United States Patent [19]

Murata et al.

[11] Patent Number: 5,233,295
[45] Date of Patent: Aug. 3, 1993

[54] ANGLE DETECTING DEVICE HAVING IMPROVED MOUNTING ARRANGEMENT FOR MOUNTING HALL-EFFECT SENSOR

[75] Inventors: Shigemi Murata; Masayuki Ikeuchi, both of Himeji, Japan

[73] Assignee: Mitsubishi Denki K.K., Tokyo, Japan

[21] Appl. No.: 737,549

[22] Filed: Jul. 30, 1991

[30] Foreign Application Priority Data

Aug. 2, 1990 [JP] Japan .................. 2-203902

[51] Int. Cl.⁵ .................. G01B 7/30; F02P 7/00; G01P 3/44
[52] U.S. Cl. .................. 324/207.20; 324/174; 123/146.5 A; 123/617; 310/70 R
[58] Field of Search .................. 324/207.20, 207.21, 324/207.22, 207.23, 207.25, 234, 235, 251, 252; 338/32 H; 307/309; 310/70 R, 70 A; 123/414, 617, 146.5 A; 73/517 R, 18-520

[56] References Cited

U.S. PATENT DOCUMENTS

| | | | |
|---|---|---|---|
| 4,508,092 | 4/1985 | Kiess et al. | 324/207.20 X |
| 4,965,517 | 10/1990 | Shelton et al. | 324/207.20 X |
| 5,010,263 | 4/1991 | Murata | 324/207.20 X |
| 5,014,005 | 5/1991 | Murata et al. | 324/207.20 |
| 5,028,868 | 7/1991 | Murata et al. | 324/207.20 |

Primary Examiner—Gerard R. Strecker
Assistant Examiner—Warren S. Edmonds
Attorney, Agent, or Firm—Sughrue, Mion, Zinn, Macpeak & Seas

[57] ABSTRACT

An angle detecting device including a magnetism gap where a magnetic-flux shutter rotates synchronously with a detection subject, a magnetic flux generator provided at one side of the gap, a magnetic-flux detector provided at the other side of the gap, an outlet of the signals from the detector, a frame integrally including the above-described generator, detector and outlet, and anchoring portions mechanically fixing the detector in a housing portion of the frame. In one embodiment, the anchoring portions are a pair of saw-toothed tabs formed by cutting and bending out a section of the plate. The saw-toothed tabs cut into the inner wall of the housing when the detector is inserted. In another embodiment, the anchoring portions are a pair of supporting tabs formed by bending extensions of the plate. The supporting tabs are clamped between a lower surface of the housing and a cover. In still another embodiment, a pair of coupling tabs provided with holes are formed integrally on the plate, and a pair of projections are integrally resin-molded in the housing portion of the frame. The projections passed through the holes are caulked when the detector is inserted.

11 Claims, 6 Drawing Sheets and a part of the inner wall 11c in the housing portion 11, and then the unit is inserted into the housing portion 11 in the indicated direction by an arrow B. The unit is pushed in, with the bendable portion 33 bent along the portion 33a, until the abutting surface 33b abuts the bottom surface, as shown in FIG. 8. Next, the leads 21 of the IC part 2 and the connecting ends 71 of the inserted conductors 7 are connected at an area J by spot welding.

ANGLE DETECTING DEVICE HAVING IMPROVED MOUNTING ARRANGEMENT FOR MOUNTING HALL-EFFECT SENSOR

BACKGROUND OF THE INVENTION

1. Field of the Invention

The present invention relates to an angle detecting device, more particularly to an angle detecting device for detecting crank positions or angles in an internal combustion engine by utilizing the Hall effect.

2. Description of the Related Art

FIGS. 7, 8 illustrate a conventional angle detecting device as described in the applicant's previous application (Japanese Pat. Laid Open No.2-240585). FIG. 7 is an exploded view, and FIG. 8 is a vertical sectional view. A resin-made frame 1 comprises a housing portion 11, a connector 12, a magnetic-flux guide supporter 13 and mounting means 14. The housing portion 11 includes an inner wall 11c, a bottom portion 11a, an opening 11b and a lower surface 15. A hybrid integrated circuit part 2 mounts a Hall element 2a for converting changes of the magnetic flux into electric signals and also other circuit elements. Leads 21 are for output of the signals generated by the hybrid IC part 2. A plate 3 formed by stamping a non-magnetic stainless-material plate comprises positioning means 31 for defining the position of the IC part 2, engaging means 32 for a second magnetic-flux guide 42, and a positioning bendable portion 33 for abutting the bottom portion 11a when the plate 3 is inserted into the housing portion 11. The bendable portion 33 defines the position of the plate 3 in the housing portion 11 by naturally bending along the portion indicated by 33a when the plate 3 is inserted, and by the abutting surface 33b abutting the bottom portion 11a when the plate is inserted up to the right position. The engaging means 32 is a through hole.

A first magnetic-flux guide 41 has a recess 41a for engaging with a magnet 5 and has a pair of engaging projections 41b for connecting to the magnetic-flux guide supporter 13 provided on the frame 1. Filler 8 shown in FIG. 8., e.g., silicon gel, is for protection of the circuit elements and also for electrical insulation. A cover 6 is for closing the opening 11b. Inserted conductors 7 have their inside ends 71 extended into the housing portion 11 and their outside ends 72 extended out of the frame 1 into the inside space of the connector portion 12. The inside ends 71 form connecting ends to the leads 21 of the IC part 2, and the outside ends 72 form connector pins in the connector portion 12. The inserted conductors 7 penetrate a pre-molded portion 18 between the frame 1 and the connector portion 12. In a magnetism gap G, a magnetic flux shutter 100 rotates synchronously with a detected subject.

To assemble the angle detecting device designed as above, adhesive is applied to the portions A shown in FIG. 7, and then the plate 3, the IC part 2 and the second magnetic-flux guide 42 are integrally assembled as shown in FIG. 7 into a pre-assembly unit (not shown). Adhesive is also applied to the bottom portion 11a including the bottom surface and a part of the inner wall 11c in the housing portion 11, and then the unit is inserted into the housing portion 11 in the indicated direction by an arrow B. The unit is pushed in, with the bendable portion 33 bent along the portion 33a, until the abutting surface 33b abuts the bottom surface, as shown in FIG. 8. Next, the leads 21 of the IC part 2 and the connecting ends 71 of the inserted conductors 7 are connected at an area J by spot welding.

The magnet 5 is fixed with adhesive into the recess 41a of the first magnetic-flux guide 41, and then the guide 41 with the fixed magnet 5 is fitted and fixed, such as with adhesive, to the magnetic-flux guide supporter 13. Next, after the filler 8 is filled in the housing portion 11 in which the pre-assembly unit has been contained, the cover 6 is mounted and fixed with adhesive onto the frame 1, sealing the opening 11b.

To detect the crank positions or angles of an internal combustion engine with the device designed as above, the magnetic-flux shutter 100 synchronized with the internal combustion engine is rotated in the magnetism gap G. The magnetic-flux shutter alternates allowing and shielding the magnetic flux towards the Hall element 2a. The Hall element 2a switches on and off its output signals according to the change in the magnetic flux, supplying electric signals indicative of the rotation angle in the cycle of the internal combustion engine.

In assembly of a conventional angle detecting device, an adhesive is used between the plate of the pre-assembly unit and the bottom portion of the housing in order that the unit including the plate, the IC part ad the second magnetic-flux guide is fixed in the housing portion of the frame. The curing of the applied adhesive requires substantial work and time, e.g., keeping it in the atmosphere of 150° C. for several hours, and the above work must be processed by batch processing, therefore raising the cost. Thus, the conventional design is inappropriate for mass production.

SUMMARY OF THE INVENTION

This invention is to solve the above-described problems by providing an angle detecting device in a design appropriate for mass production with minimum cost.

An angle detecting device according to the first embodiment of this invention comprises a plate of the unit which is provided with saw-toothed tabs which are formed by cutting and bending out from the plate. The saw-toothed tabs cut into the inner wall and thus fix the plate in the housing when the plate is pushed into the housing.

Another angle detecting device according to the second embodiment of this invention comprises a plate provided with supporting tabs which are formed on the side of the opening thereon and have spring functions. The supporting tabs are clamped between the cover and the lower surface in the housing when the cover is mounted, and thus the plate is fixed in the housing.

Still another angle detecting device according to the third embodiment of this invention comprises a frame provided with projections on the lower surface in the housing and a plate provided, on its edge closer to the opening, with coupling tabs bent approximately at right angles. The tabs have holes for the projections to fit in. The projections inserted through the holes are caulked, and thus the plate is fixed in the housing.

DESCRIPTION OF THE PREFERRED EMBODIMENTS

Figure 1:
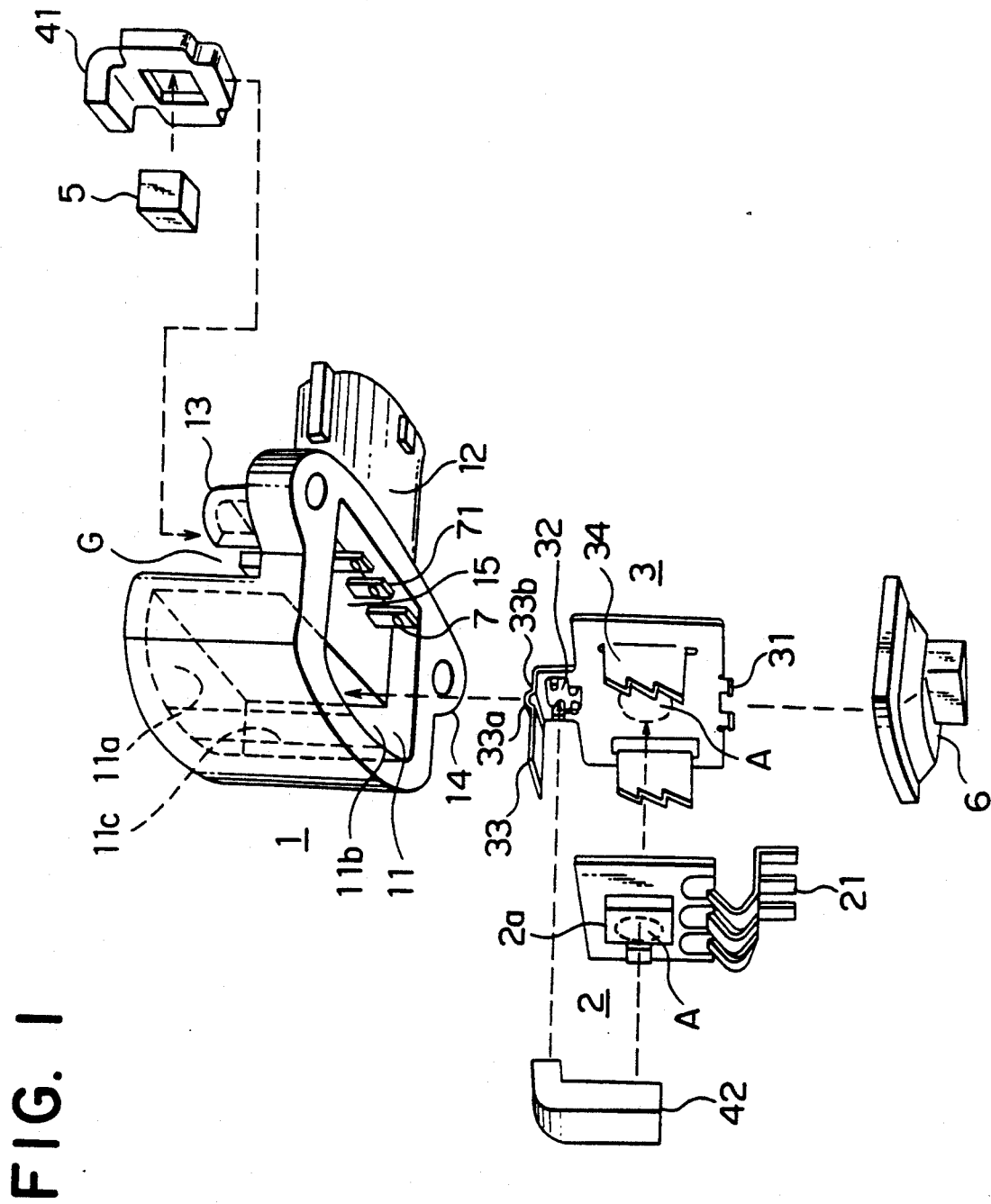
FIG. 1 is an exploded view of an angle detecting device according to the first embodiment of the present invention.
Figure 2:
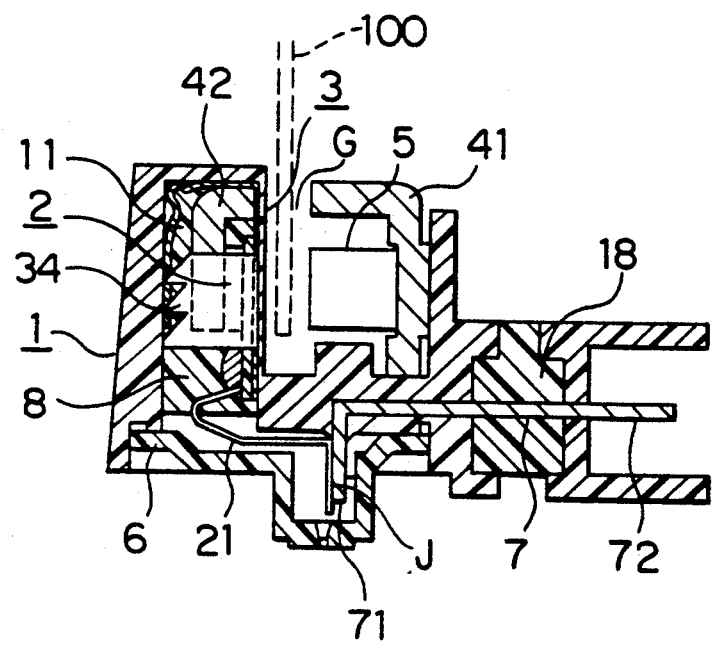
FIG. 2 is a vertical sectional view of an angle detecting device shown in the FIG. 1.
Figure 7:
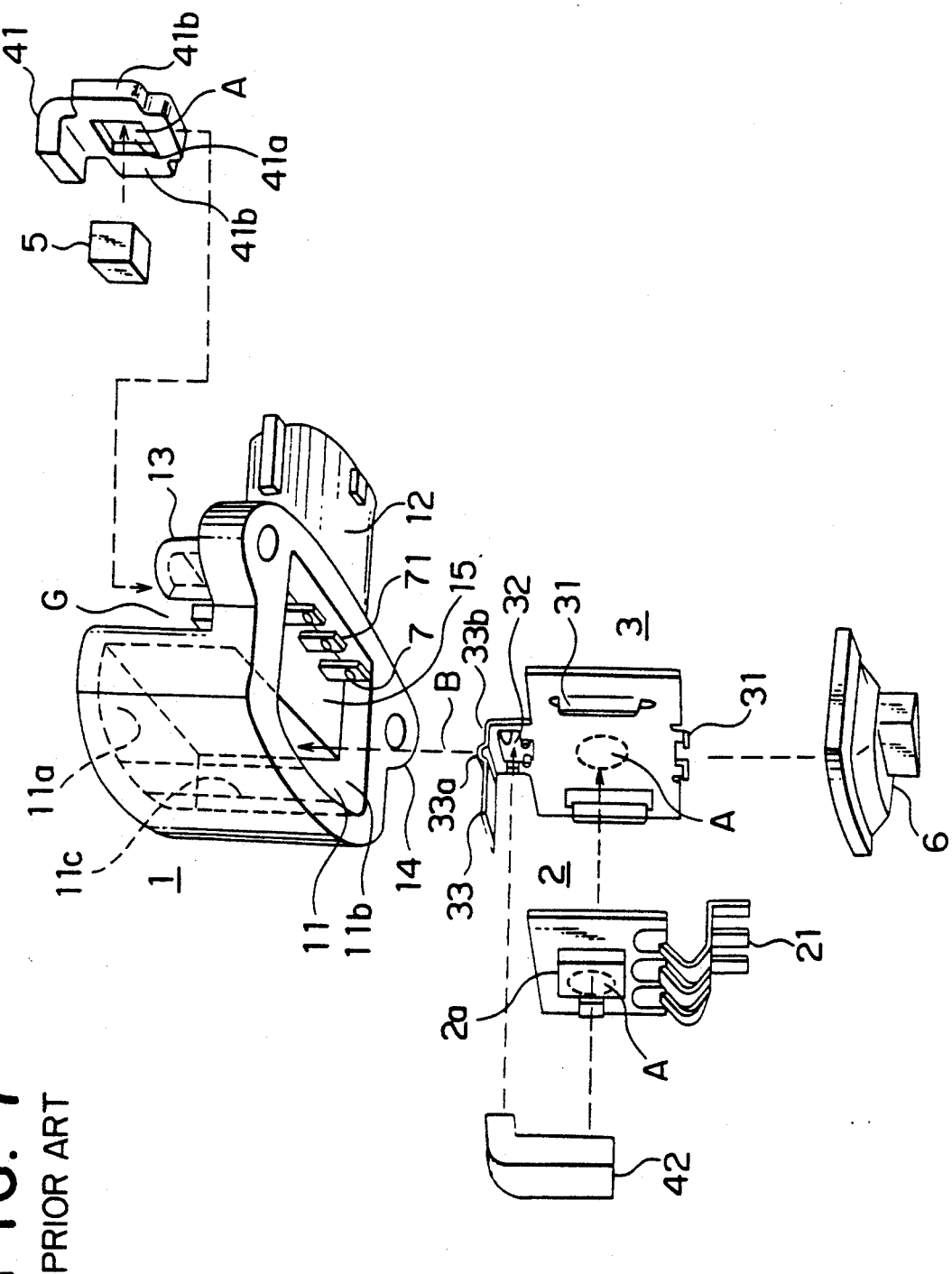
FIG. 7 is an exploded view of a conventional angle detecting device.
Figure 8:
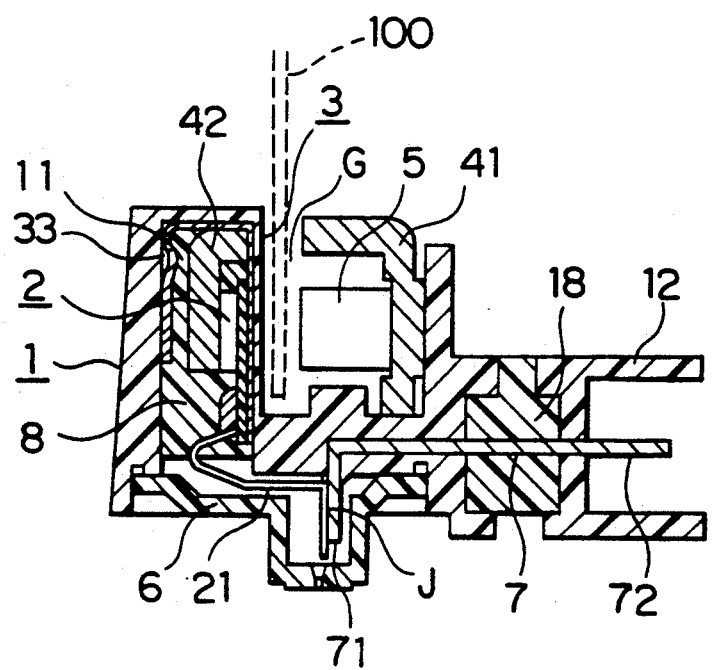
FIG. 8 is a vertical sectional view of an angle detecting device shown in the FIG. 7.

Referring to FIGS. 1, 2, parts referred to by the same characters as in FIGS. 7, 8 are same or corresponding parts as those of the conventional device in FIGS. 7, 8, so that a description of these parts is omitted. In FIGS. 1, 3, 5 and 7, the opening portion of the frame is illustrated in a simplified manner.

In the first embodiment of the present invention shown in FIGS. 1, 2, a housing portion 11 of a frame 1 contains a unit which includes a plate 3. The plate 3 is provided with a pair of saw-toothed tabs 34 which are formed on the same side as a bendable portion 33 by cutting a portion of the plate 3 and then bending out the cut portion. The tabs 34 have elasticity or spring function, further defining a position of the IC part 2.

In the assembly of this embodiment, a second magnetic-flux guide 42, an IC part 2 and the plate 3 are fixed to each other with adhesive and built into a unit. When the unit is pushed into the housing portion 11 of the frame 1, the saw-teeth of the tabs 34 cut into an inner wall 11a of the housing portion 11 so as to fix the plate 3 in the correct position in the housing 11. Thus, the unit is fixed in the housing portion 11 of the frame 1 without using an adhesive therebetween.

Figure 4:
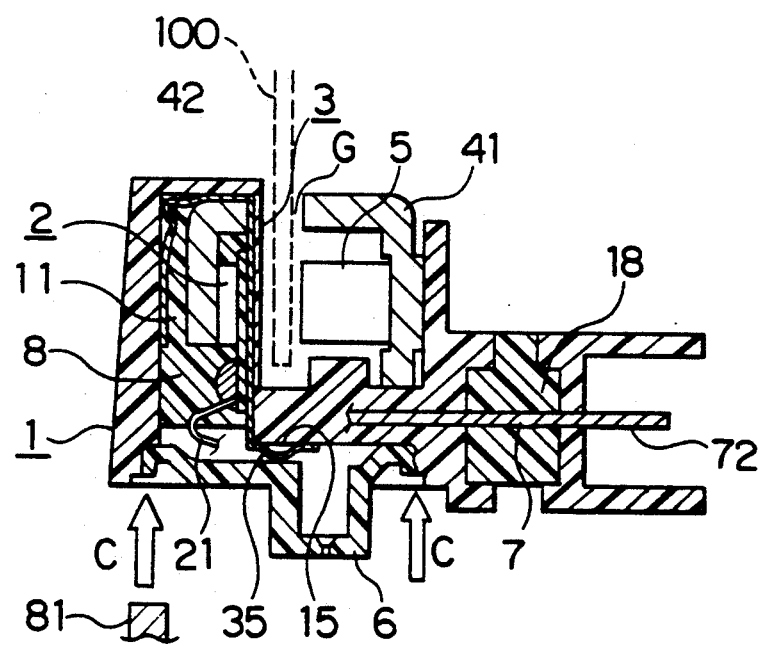
FIG. 4 is a vertical sectional view of an angle detecting device shown in the FIG. 3.
Figure 3:
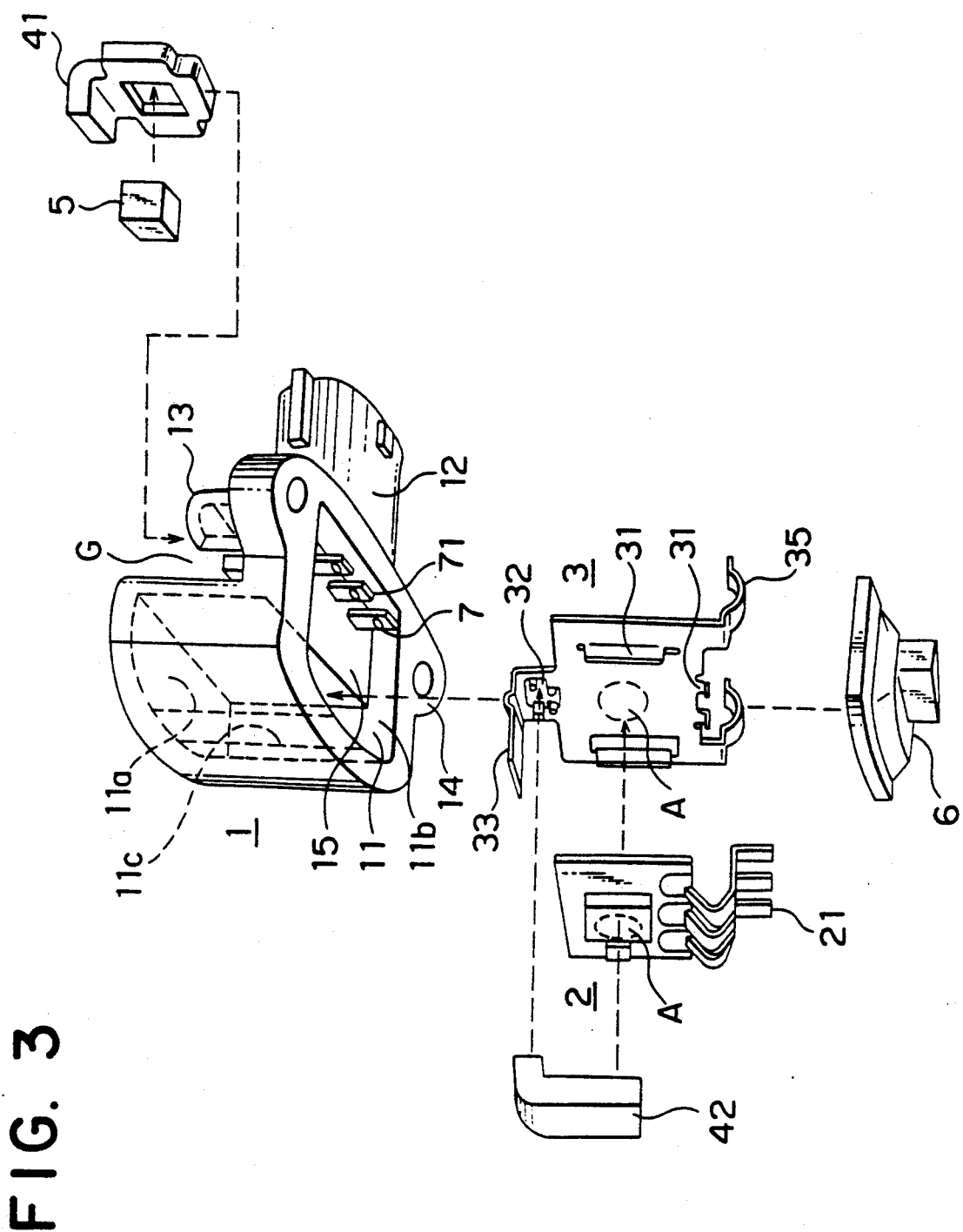
FIG. 3 is an exploded view of an angle detecting device according to the second embodiment of the present invention.

Now, referring to FIGS. 3, 4 which show a second embodiment of this invention, (the connected portions of leads 21 and the inside ends of inserted conductors 7 are not illustrated in FIG. 4.) a plate 3 is provided with a pair of supporting tabs 35 on the lower edge thereof, that is, the edge close to an opening 11b when the plate 3 is inserted in the housing 11. These supporting tabs 35 are formed as integrally extended portions of the plate 3 and are bent at almost right angles to a side of the plate 3 opposite to positioning means 31. The tabs 35 have arch portions having spring functions or elasticity. Further, in this embodiment, the cover 6 is made of thermoplastic resin.

In the assembly of this embodiment, when the unit has been inserted in the housing portion 11 of the frame 1 and the cover 6 is fitted onto the opening 11b, the supporting tabs 35 are clamped between the cover 6 and a lower surface 15 in the housing 11, as shown in FIG. 4.

The connecting edges of the cover 6 and the opening 11b of the frame 1 are fused and welded by a hot iron 81, as shown by an arrow C in FIG. 4, and thus the cover 6 is fixed to the frame 1. In this way, the unit is fixed in the housing portion 11 of the frame 1 without using an adhesive.

Figure 5:
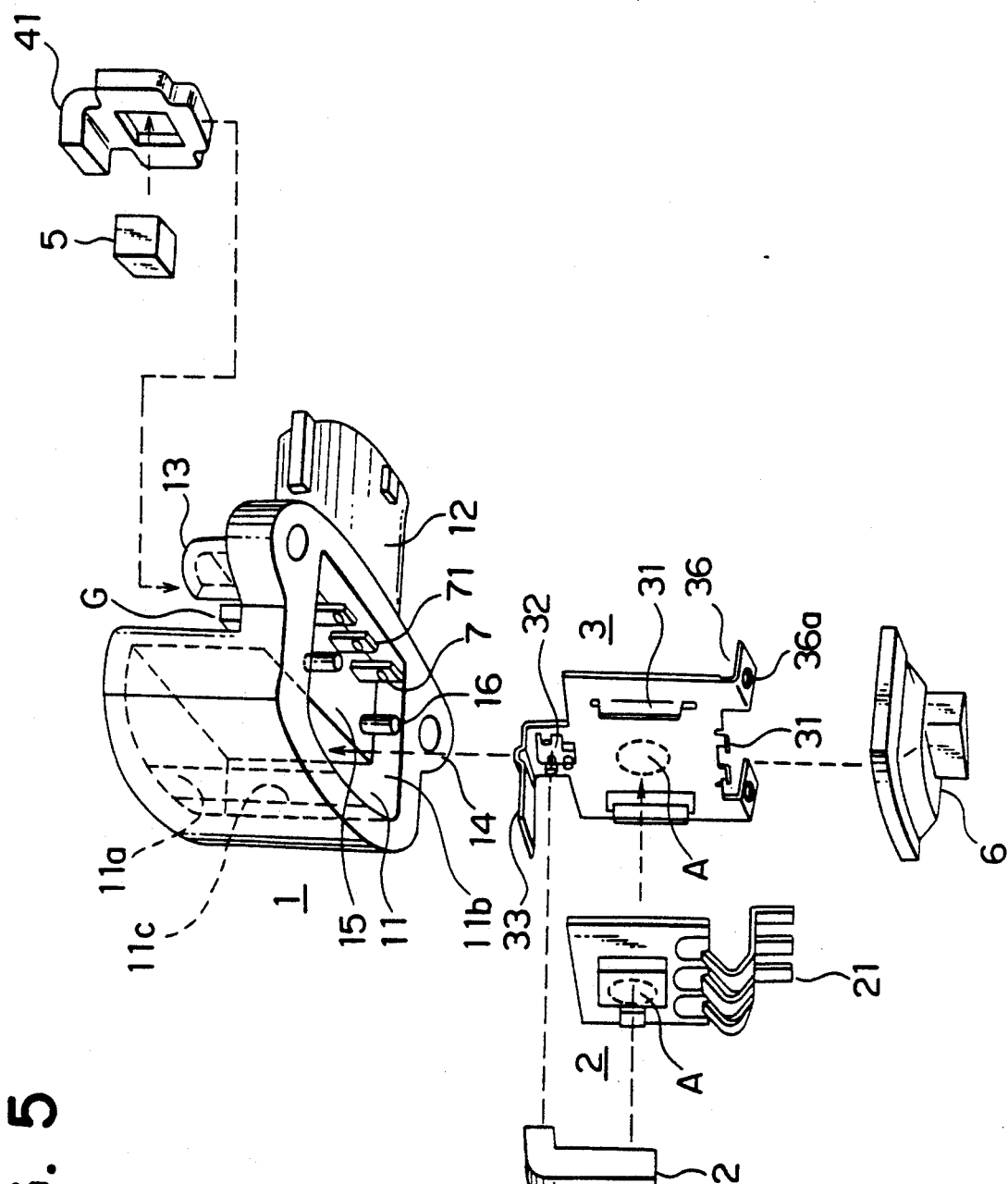
FIG. 5 is an exploded view of an angle detecting device according to the third embodiment of the present invention.
Figure 6:
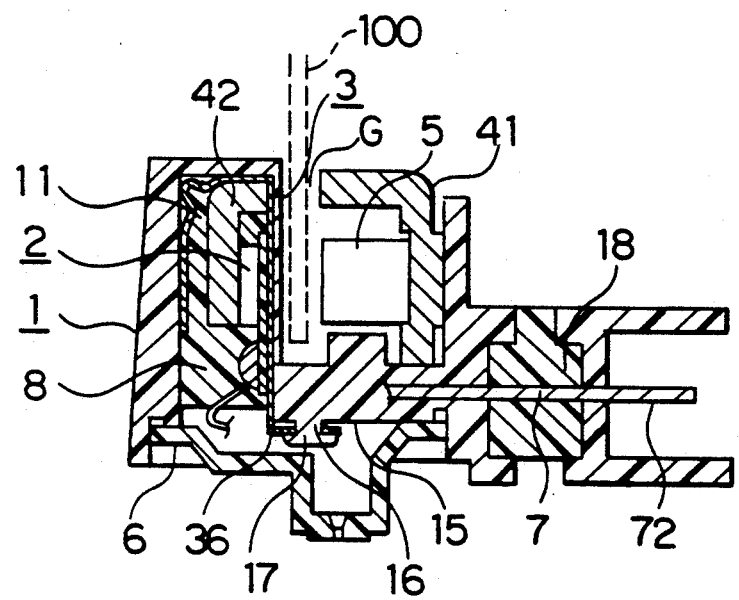
FIG. 6 is a vertical sectional view of an angle detecting device shown in the FIG. 5.

With reference to FIGS. 5, 6 showing a third embodiment of this invention, (the connected portions of the leads 21 and the inside ends of the inserted conductors 7 are omitted from the illustration in FIG. 6.) the frame 1 has a pair of projections 16 integrally resin-molded on the lower surface 15 of the housing portion 11, and the plate 3 has a pair of coupling tabs 36 formed on the lower edge thereof. The coupling tabs 36 are integrally extended portions of the plate 3 bent approximately at right angles to the side opposite to the positioning means 31. The tabs 36 have holes 36a for the projections 16 to engage with.

In this embodiment, as in the other embodiments, the second magnetic-flux guide 42, the hybrid IC part 2 and the plate 3 are fixed to each other with an adhesive and built into a pre-assembly unit. When the unit is inserted into the housing portion 11 of the frame 1, the projections 16 fit through the hole 36a of the coupling tabs 36. Then, the excess portions of the projection 16 passed through the holes 36a are thermoplastically flattened or caulked as shown in FIG. 6, and thus the unit is fixed in the housing portion 11 of the frame 1 without using an adhesive therebetween.

In each embodiment described above, a magnetic-flux generator 5 and a first magnetic-flux guide 41 compose magnetic-flux generating means. The unit including the IC part 2, the second magnetic-flux guide 42 and the plate 3 having a bendable portion 33 and positioning portions 31, 32 form magnetic-flux detecting means. The frame includes the housing portion 11, a connector portion 12, a magnetic flux guide supporter 13, mounting means 14, filler 8 and the cover 6. The inserted conductors 7 make up signal outlet means. The means for fixing the unit in the housing 11 include the saw-toothed tabs 34 in the first embodiment, the supporting tabs 35 in the second embodiment, and the projections 16 and the coupling tabs 36 having the holes 36a in the third embodiment.

Though the saw-toothed tabs 34 in the first embodiment are cut and bent out from the plate to form the anchoring means, the embodiment is only illustrative and not exclusive.

Although the second and third embodiments show the supporting tabs and the coupling tabs respectively both of which are formed by bending the integrally extended portions of the plate 3, these embodiments are also only illustrative and not restrictive.

As in the second embodiment, the cover 6 may be fixed by fusion or welding to the opening 11b of the frame 1 in the first and third embodiments.

Since the pre-assembly unit can be fixed in the housing portion of the frame without using an adhesive, as described in each of the above-embodiments, an angle detecting device according to the present invention requires less labor and time for the assembly, facilitates mass production and reduces production costs.

What is claimed is:

1. A Hall-effect sensor device for generating an electrical signal in response to a variation of magnetic flux caused by a magnetic-flux shutter, comprising:

a frame including a housing portion defining a box-shaped cavity (11) open in one direction, and a magnetic flux guide holder (13) disposed opposite a side wall of the cavity across a predetermined magnetic gap;

a magnetic-flux detecting means (2) secured to a mounting plate for converting a variation of magnetic flux caused by the magnetic shutter into electrical signals, said detecting means being disposed within said cavity of said frame;

a magnetic-flux generating means (5) connected to said magnetic-flux guide holder so as to oppose said detecting means across said predetermined gap through which the magnetic flux shutter is translated to cause the variation of the magnetic flux that passes through the detecting means;

signal outlet means fixed to said frame for outputting the electrical signals generated by said detecting means; and anchoring means for anchoring said detecting means within said cavity of said frame, said anchoring means including a plurality of protruding members which are integral to said mounting plate and which protrude therefrom so as to positively engage a portion of said frame to positively retain said detecting means within said cavity.

2. The angle detecting device according to claim 1 wherein:

said magnetic-flux generating means includes a magnetic-flux generator for generating magnetic-flux and a first magnetic-flux guide connected with said magnetic-flux generator;

said magnetic-flux detecting means includes, as one unit, a hybrid integrated circuit having at least a Hall element for converting the changes of magnetic-flux into electric signals, a second magnetic flux guide facing said first magnetic-flux guide through sad magnetic flux shutter in said magnetic gap and for guiding the magnetic-flux between said first magnetic-flux guide and said Hall element, a non-magnetic-material plate onto which said hybrid IC part and said second magnetic-flux guide are each fixed in a pre-determined position, a positioning bendable portion integrally formed on said plate and for defining the position of said plate in said housing portion, and at least one lead extending from said hybrid IC part and for transmitting the electric signals generated by said Hall element to said signal outlet means;

said frame means includes a supporting portion provided at one side of said magnetic gap and for supporting said magnetic-flux generating means, a housing portion provided at said other side of said magnetic gap for housing said magnetic-flux detecting means, filer means being filled in the housing portion containing said magnetic-flux detecting means for protecting said Hall element, a cover for closing said housing portion, a connector portion having therein said signal outlet means, said housing portion having an opening for allowing insertion of said magnetic-flux detecting means into said housing portion and interconnecting said lead and said signal outlet means, and said cover for closing said opening; and said signal outlet means includes at least one inserted conductor which extends inside said connector means, and which has its inside end electrically connected to said lead in the housing portion and has its outside end electrically connectable from outside of the case.

3. The angle detecting device according to claim 1 wherein:

said housing portion has an inner wall partially defining said cavity;

and wherein said protruding members include a pair of saw-toothed anchoring portions having elasticity and formed on said plate; and said pair of anchoring portions define the position of said detecting means on said mounting plate and are cut into said inner wall when said unit is inserted into said housing portion, fixing said unit therein.

4. The angle detecting device according to claim 3, wherein said saw-toothed anchoring portions are formed by cutting portions of said plate and bending said cut portions out from said plate.

5. The angle detecting device according to claim 1, further comprising a cover for covering said opening and wherein said housing portion includes a lower surface facing said opening; and said protruding members include a pair of elastic supporting tabs formed on said plate at the side closest to said opening;

said supporting tabs being clamped between said cover and said lower surface of said housing portion when said cover is fitted onto said opening.

6. The angle detecting device according to claim 5 wherein said supporting tabs are formed by bending said plate.

7. The angle detecting device according to claim 5 wherein said supporting tabs have arch-shaped portions to provide elasticity.

8. The angle detecting device according to claim 1, wherein:

said housing portion has a lower surface facing said opening and includes a pair of projections formed on said lower surface, and wherein said protruding numbers includes a pair of coupling tabs formed on said plate at the side closer to said opening and provided with holes for said projections to pass through;

the excess portions of the projections passed through said holes being thermoplastically flattened.

9. The angle detecting device according to claim 8 wherein said coupling tabs are formed by bending said plate.

10. The angle detecting device according to claim 8 wherein said projections are resin-molded integrally on said lower surface in said frame.

11. The angle detecting device according to claim 2 wherein said cover is made of thermoplastic resin so as to be fixed to said opening by heat fusion.

* * * * *